(12) United States Patent
Patel

(10) Patent No.: US 11,981,601 B2
(45) Date of Patent: May 14, 2024

(54) IN-SITU POLYPHOSPHAZENE GENERATION IN CEMENT FOR IMPROVED ELASTIC PROPERTIES

(71) Applicant: ARAMCO SERVICES COMPANY, Houston, TX (US)

(72) Inventor: Hasmukh A. Patel, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 310 days.

(21) Appl. No.: 17/141,783

(22) Filed: Jan. 5, 2021

(65) Prior Publication Data

US 2022/0212989 A1 Jul. 7, 2022

(51) Int. Cl.
*C04B 16/06* (2006.01)
*C04B 7/02* (2006.01)
(Continued)

(52) U.S. Cl.
CPC ............ *C04B 16/0675* (2013.01); *C04B 7/02* (2013.01); *C04B 28/04* (2013.01); *C08G 79/025* (2013.01); *C09K 8/467* (2013.01); *C04B 24/243* (2013.01); *C04B 2103/0035* (2013.01); *C04B 2103/0048* (2013.01)

(58) Field of Classification Search
CPC ....... C04B 16/0675; C04B 7/02; C04B 28/04; C04B 24/243; C04B 2103/0035; C04B 2103/0048; C04B 16/06; C04B 2103/0046; C04B 2103/0045; C04B 2103/00;
(Continued)

(56) References Cited

U.S. PATENT DOCUMENTS 4,872,936 A 10/1989 Engelbrecht
7,036,586 B2 5/2006 Roddy et al.
(Continued)

FOREIGN PATENT DOCUMENTS

CN 105112031 B 10/2017
CN 107721272 A 2/2018
(Continued)

OTHER PUBLICATIONS

SU-98689719-A1, abstract machine translation (Year: 1983).*
Tanyildizi et al. High temperature resistance of polymer-phosphazene concrete for 365days, Construction and Building Materials, (2018) vo. 174, pp. 741-748. DOI: 10.1016/j.conbuildmat. 2018.04.078. (Year: 2018).*
(Continued)

*Primary Examiner* — Bryan D. Ripa
*Assistant Examiner* — Marites A Guino-O Uzzle
(74) *Attorney, Agent, or Firm* — Osha Bergman Watanabe & Burton LLP

(57) ABSTRACT

A composition of matter may include a cement precursor, a phosphazene oligomer and water. A method may include blending a phosphazene oligomer and a cement precursor to form a cement precursor mixture. The method may then include introducing water into the cement precursor mixture to form the cement slurry. A composition of matter may include a cured cement matrix having a polyphosphazene polymer distributed throughout the cement matrix. A method may include cementing a wellbore by introducing a cement slurry into a wellbore, where the cement slurry includes a phosphazene oligomer. The method then includes maintaining the cement slurry such that a cured cement sheath forms, the cement sheath having a polyphosphazene polymer.

19 Claims, 2 Drawing Sheets

(51) Int. Cl.
*C04B 28/04* (2006.01)
*C08G 79/025* (2016.01)
*C09K 8/467* (2006.01)
*C04B 24/24* (2006.01)
*C04B 103/00* (2006.01)

(58) Field of Classification Search
CPC ......... C04B 2103/0082; C08G 79/025; C08G 79/02; C09K 8/467
See application file for complete search history.

(56) References Cited

U.S. PATENT DOCUMENTS

| | | | |
|---|---|---|---|
| 7,156,174 | B2 | 1/2007 | Roddy et al. |
| 2004/0261993 | A1 | 12/2004 | Nguyen |
| 2005/0167107 | A1 | 8/2005 | Roddy et al. |
| 2006/0172894 | A1 | 8/2006 | Mang et al. |
| 2016/0053158 | A1 | 2/2016 | Roddy et al. |
| 2018/0148629 | A1 | 5/2018 | Pisklak et al. |
| 2021/0102112 | A1* | 4/2021 | Patel .................. C04B 24/2611 |

FOREIGN PATENT DOCUMENTS

| | | | | |
|---|---|---|---|---|
| CN | 207776197 | U | | 8/2018 |
| CN | 106554764 | B | | 2/2019 |
| CN | 111517703 | A | * | 8/2020 ......... C04B 24/2652 |
| SU | 98689719 | A1 | * | 1/1983 |

OTHER PUBLICATIONS

Allcock, Harry R., Ursula Diefenbach, and Shawn R. Pucher. "New mono-and trispirocyclotriphosphazenes from the reactions of (NPCI2) 3 with aromatic ortho dinucleophiles." Inorganic Chemistry 33.14 (1994): 3091-3095. <URL: https://pubs.acs.org/doi/pdf/10.1021/ic00092a013> (Year: 1994).*
CN111517703a, machine translation (Year: 2020).*
B Chen, G Qiao, D Hou, M Wang, Z Li, Cement-based material modified by in-situ polymerization: From experiments to molecular dynamics investigation, Composites Part B: Engineering 194 (2020), 108036. DOI:10.1016/j.compositesb.2020.108036. (Year: 2020).*
B., Eric et al., "Oil Well Cement Additives: A Review of the Common Types", Oil and Gas Research, vol. 2, Issue 2, Feb. 2016, pp. 1-6 (6 pages).
Rothemund, Sandra and Ian Teasdale, "Preparation of polyphosphazenes: a tutorial review", Chemical Society Reviews, Royal Society of Chemistry, vol. 45, Jun. 2016, pp. 5200-5215 (16 pages).
Potin, Ph. and R. De Jaeger, "Polyphosphazenes: Synthesis, Structures, Properties, Applications", European Polymer Journal, Pergamon Press plc, vol. 27, No. 4-5, 1991, pp. 341-348 (9 pages).
Allcock, Harry R., "Polyphosphazene elastomers, gels, and other soft materials", Soft Matter, Royal Society of Chemistry, vol. 8, Jun. 2012, pp. 7521-7532 (13 pages).
International Search Report issued in corresponding International Application No. PCT/US2022/011229, dated May 3, 2022 (3 pages).
Written Opinion issued in corresponding International Application No. PCT/US2022/011229, dated May 3, 2022 (5 pages).

* cited by examiner

IN-SITU POLYPHOSPHAZENE GENERATION IN CEMENT FOR IMPROVED ELASTIC PROPERTIES

BACKGROUND

Cement slurries are used in the oil and gas industry for cementing oil and gas wells. Cement holds the casing in place and prevents fluid migration between subsurface formations. Primary cementing includes pumping cement down a casing and into an annulus between the formation and the casing (or between casings). Secondary cementing, or remedial cementing, is performed to repair primary cementing issues. Cements used in the oil and gas industry must be able to withstand the extreme temperatures, pressures and chemical environments encountered in hydrocarbon-bearing formations.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to a composition of matter including a cyclic oligomer that has a phosphazene.

In another aspect, embodiments disclosed relate to a method of making an oligomer. The method may include reacting at least two monomers to form an oligomer, where a first monomer is a cyclic phosphazene monomer, and where a second monomer is a di-functional monomer.

In yet another aspect, embodiments disclosed related to a composition of matter including a cement precursor, a phosphazene oligomer and water.

In another aspect, embodiments disclosed relate to a method of making a cement slurry, the method including blending a phosphazene oligomer and a cement precursor to form a cement precursor mixture, and introducing water into the cement precursor mixture.

In yet another aspect, embodiments disclosed relate to a composition of matter including a cured cement matrix having a polyphosphazene polymer distributed throughout the cement matrix.

In another aspect, embodiments disclosed relate to a method of cementing a wellbore, the method including introducing a cement slurry into a wellbore, where the cement slurry includes a phosphazene oligomer. The method then includes maintaining the cement slurry such that a cured cement sheath forms, the cement sheath having a polyphosphazene polymer.

Other aspects and advantages of the claimed subject matter will be apparent from the following description and the appended claims.

DETAILED DESCRIPTION

Figure 1:
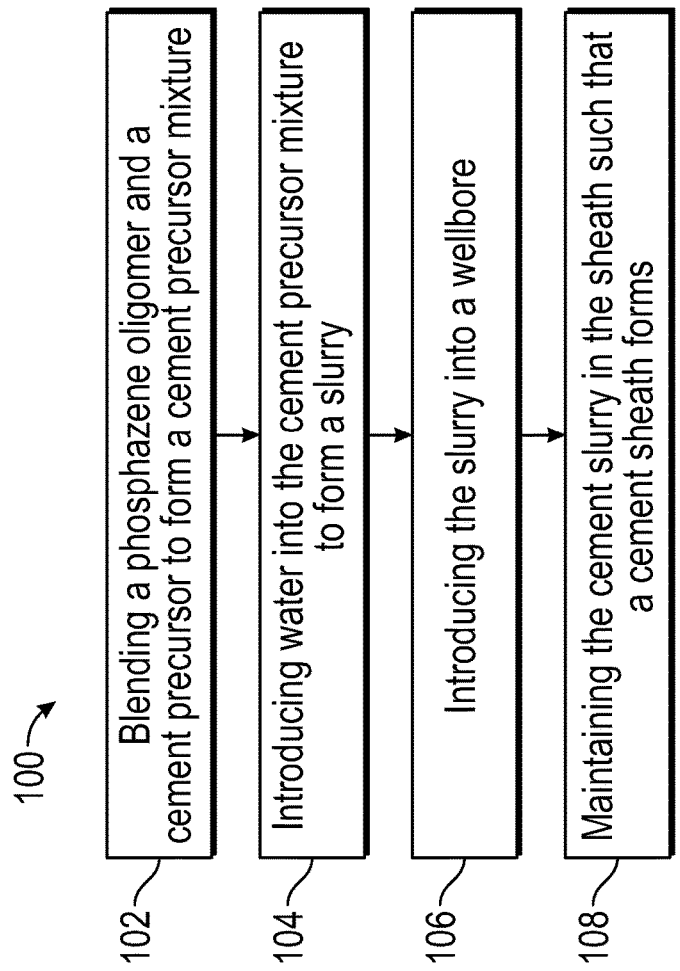
FIG. 1 is a block flow diagram of an embodiment method of making a cement slurry.

Oil and gas well cementing is an important operation during drilling and completion of oil wells. The cement sheath must maintain well integrity behind the casing and provide long-term zonal isolation to ensure safety and prevent environmental problems. The cements placed in the annulus between the casing and the formations (or between casings) experiences stress at wellbore conditions, especially as pressure and temperatures change or cycle with the movement of fluids and equipment. Physical degradation of the cement over a period can cause deterioration in both the mechanical structure of the cement and the chemical adhesion the cement has to the casing, tubing or wellbore wall. Such degradation can negatively impact production, increase costs, and reduces the margin of safely operating the well.

Although polymeric-based additives have been employed to modify the mechanical properties of cement, the physical mixing of polymers into cement slurries often results in a non-uniform distribution. Generally, latex, polyolefin fibers or rubber particles are blended into the cement, followed by a period of curing to obtain the cured or "set" cement. Because blending of polymer strands or blocks is imperfect, the formation of pockets of pure polymer or "islands" may occur in the cured cement matrix. This leads to a heterogeneity of the cement.

The present disclosure relates to compositions and methods for achieving a homogeneous polymer distribution in a cement matrix. Specifically, phosphazene oligomers are blended into a cement slurry and undergo polymerization downhole during the cement curing process. The heat of the formation around the cement slurry initiates this in-situ polymerization as the heat of formation is transferred into the slurry. In some instances, the cement slurry itself may initiate the polymerization as it cures due to heat generated from the curing reactions. Polymerization of the well-distributed oligomers achieves a uniform distribution of the polyphosphazene polymers throughout the cement matrix that avoids the non-uniformity common in cement composition merely using pre-formed polymers.

Oligomer Composition

In one aspect, embodiment compositions include an oligomer. Embodiment oligomers may be cyclic. For embodiment compositions, the cyclic oligomer includes a phosphazene. Embodiment phosphazenes have a double bond between phosphorous and nitrogen. An embodiment oligomer has structure (1):

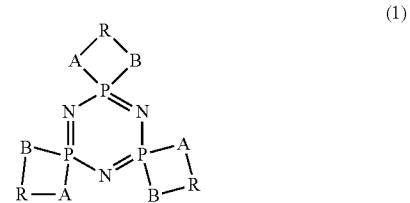

(1)

where R may have any suitable alkyl or aryl structure, such as aliphatic, aromatic, alkyl aromatic, and polyaromatic structures. A and B are each reduced nucleophilic chemical functionalities of a di-functional compound having been reduced during a reaction to form the embodiment oligomer. The reaction will be explained in greater detail.

Previously-described phosphazene oligomers may be synthesized from at least two monomers. In some embodiments, a cyclic phosphazene monomer, such as hexachlorocyclotriphosphazene, may be used at a first monomer. Hexachlorocyclotriphosphazene (also known as hexachlorotriphosphazene, triphosphonitrilic chloride, or phosphonitrilic chloride) is shown as structure (2):

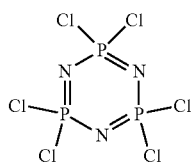
(2)

In some embodiments, a cyclic phosphazene monomer, such as hexachlorocyclotriphosphazene, is reacted with a di-functional monomer to produce the previously-described cyclic oligomers. Embodiment di-functional monomers may be aliphatic diamines, aromatic diamines, or combinations of these, such as o-phenylenediamine, trimethylamine, 2,3-diaminonaphthalene, and ethylenediamine. Embodiment di-functional monomers may be aliphatic diols, such as ethylene glycol, aromatic diols, such as 1,2-dihydroxy benzene, or combinations of these. Embodiment di-functional monomers may be aliphatic thiols, such as ethylene dithiols, aromatic thiols, such as benzene-1,2-dithiol, or combinations of these. Embodiment di-functional monomers may be mixed functional groups of aliphatic or aromatic di-functional compounds, such as 2-mercaptophenol, 1-hydroxy-2-aminobenzene, and 2-aminoethen-1-ol, and their respective families of compounds.

Embodiment phosphazene oligomers may include oligomers with structures shown in structures (3), (4) and (5):

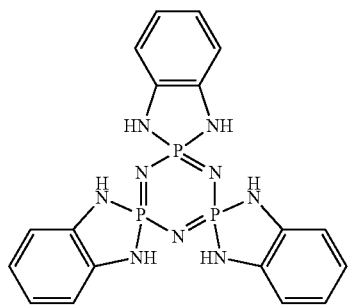
(3)

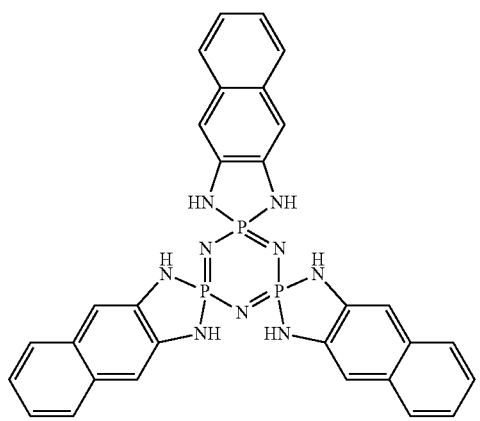
(4)

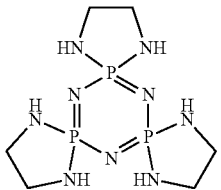
(5)

Method of Making a Phosphazene Oligomer

In one aspect, embodiment methods include reacting at least two monomers to form an oligomer. Embodiment reactions include a nucleophilic substitution of the cyclic phosphazene monomer with the previously-described di-functional monomer. The cyclic phosphazene monomer may be hexachlorotriphosphazene. A general reaction pathway of synthesizing embodiment oligomers is shown in structure (6):

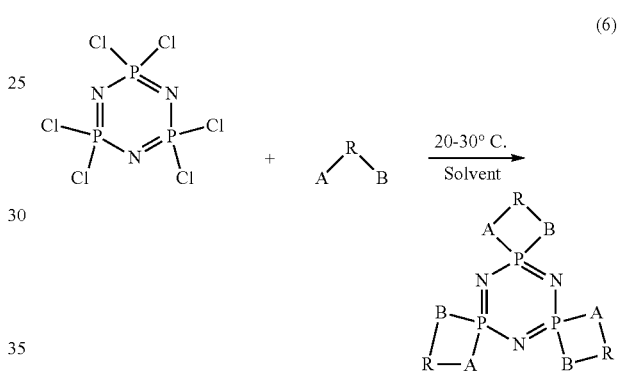
(6)

where R, A, and B are as previously described. As shown here, each A and B functionality are reduced in this reaction—losing a hydrogen—whereas the cyclic phosphazene monomer loses all of its halogen functionalities to form one or more P-B-R-A ring functionalities on the triphosphazene ring, where each ring varies depending on the di-functional monomer utilized.

Embodiment oligomers may be synthesized using any suitable molar ratio of cyclic phosphazene monomer:di-functional monomer to achieve a desired oligomer structure. Embodiment syntheses may have a cyclic phosphazene monomer:di-functional monomer molar ratio in a range of from about 1:8 to about 1:2, such as 1:8, 1:6, 1:3 or 1:2.

Embodiment oligomers may be synthesized in any suitable solvent, such as chlorinated solvents. Embodiment chlorinated solvents may include chloroform, dichloro methane, chlorobenzene, carbon tetrachloride, dichloro benzene, tetrahydrofuran, dioxane, dimethyl formamide, or methyl pyrrolidone.

Embodiment oligomers are synthesized by first mixing the previously-described cyclic phosphazene monomer and di-functional monomer at a temperature of from about 0 to about 8° C. in a previously-described solvent. The monomer mixture is then stirred at a temperature of from about 0 to about 80° C. for from about 2 to about 72 hours to allow the reaction to proceed to completion. Reaction temperatures and times may be adjusted accordingly depending on the monomer reactants and the desired oligomer structure. Once the reaction is complete, the oligomer product is filtered and washed with an appropriate solvent, such as ethanol.

Method of Use—Phosphazene Oligomers

Embodiment oligomers may be used as oligomer precursors for making polyphosphazene polymers. Embodiment oligomers may be useful if incorporated into a cement slurry such that they may polymerize and form polyphosphazene polymers in cement.

Polyphosphazene Composition

In one aspect, a composition includes a cross-linked polyphosphazene polymer. Embodiment polyphosphazene polymers are cross-linked structures formed via the polymerization of the previously-described phosphazene oligomers. An embodiment polyphosphazene has structure (7):

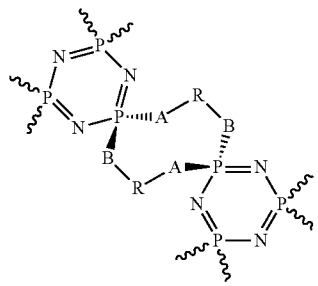

(7)

where R, A, and B are as previously described. The curved lines represent repeating continuations of the polymer structure. As shown, the polyphosphazene has a cross-linked, networked structure. Such structures are stable and do not degrade under formation conditions.

Embodiment polymers may be polyphosphazene polymers with structures shown in structures (8), (9) and (10).

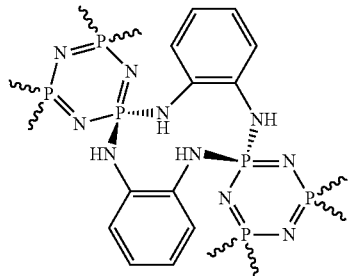

(8)

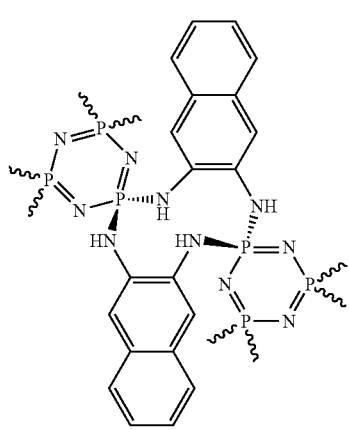

(9)

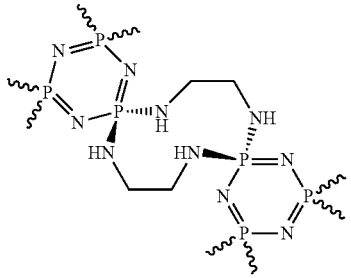

(10)

The embodiment polymer having structure (8) was made via the polymerization of oligomer structure (3). The embodiment polymer having structure (9) was made via the polymerization of oligomer structure (4). The embodiment polymer having structure (10) was made via the polymerization of oligomer structure (5).

Method of Making Polyphosphazene Polymers

In one aspect, embodiment methods polymerizing a cyclic oligomer having a phosphazene to form a cross-linked polyphosphazene polymer. Embodiment phosphazene oligomers may be polymerized via a cross-linking polymerization mechanism. A reaction pathway showing the cross-linking mechanism of polymerization is structure (11):

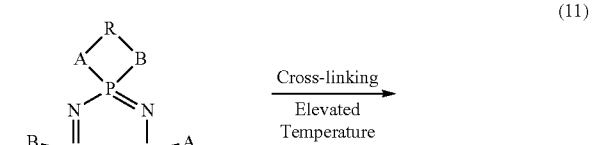

(11)

where R, A, and B are as previously described. Embodiment polymerizations may be performed in the dry state, or in a slurry, or in a solution. In some embodiments, polymerization may be performed in water. In some embodiments, the polymerization may be performed in the solution into which the pre-cement is introduced, that is, water with downhole cementing additives, such as suspending agents, cement retarders, cement accelerators, cement extenders, weighting agents, fluid loss agents, lost circulation materials, and combinations thereof. Embodiment suspending agents may be hydrophilic polymers, such as hydroxyethyl cellulose (HEC), polyhydroxylated polyacrylamide (PHPA), or acrylic and acrylamide-based polymers. Embodiment cement retarders may include lignosulfonates, hydroxycarboxylic acids, cellulose derivatives, and combinations thereof. Embodiment cement accelerators may include, calcium chloride, sodium chloride, sodium metasilicate, potassium chloride, gypsum, and combinations thereof. Embodiment cement extenders may include bentonite, sodium silicate, volcanic ash, diatomaceous earth, perlite, and combinations thereof. Embodiment weighting agents may include hematite, ilmenite, barite, and combinations thereof. Embodiment fluid loss additives may include polymer additives such as cellulose, polyvinyl alcohol, polyalkanolamines, polyacrylamides, liquid latex, and combinations thereof. Embodiment loss circulation materials may include ground coal, ground gilsonite, ground walnut hull, and combinations thereof.

Embodiment polymerization temperatures may be in a range of from about 50 to about 300° C. Embodiment polymerization temperatures may have a lower limit of about 50, 75, 100, 125, or 150° C. and an upper limit of about 300, 275, 250, 225, or 200° C., where any lower limit may be used in combination with any mathematically compatible upper limit.

Polymerization pressures may be from about ambient pressure to about 45,000 psi (pounds per square inch). Embodiment polymerization pressures may have a lower limit of 15, 100, 1,000, 3,000 or 5,000 psi, and an upper limit of 45,000, 30,000, 20,000, 15,000 or 10,000 psi, where any lower limit may be used in combination with any mathematically compatible upper limit.

Method of Use—Polyphosphazene Polymers

The previously-described oligomers may be intimately mixed with a cement slurry. Upon curing of the cement at elevated temperatures, the oligomers undergo the previously-described polymerization reactions to form embodiment polyphosphazene polymers evenly distributed throughout a cured cement matrix. Such polyphosphazene polymers may be useful for modifying the properties of the cured cement.

Cement Slurry Composition

In one aspect, embodiment compositions relate to a slurry having a cement precursor, a phosphazene oligomer and water.

Embodiment slurries include a cement precursor material. The cement precursor material may be any suitable material that when mixed with water can be cured into a cement. The cement precursor material may be hydraulic or nonhydraulic. A hydraulic or non-hydraulic cement precursor material may be chosen based on the desired application of the cement slurry of the present disclosure.

In some embodiments, the cement slurry comprises a hydraulic cement precursor. Hydraulic cements precursors are materials that refer to a mixture of limestone, clay and gypsum burned together under extreme temperatures that may begin to harden instantly or within a few minutes while in contact with water.

In some specific embodiments, the cement precursor material may be Portland cement precursor, such as Class A Portland Cement, Class B Portland Cement, Class C Portland Cement, Class G Portland Cement or Class H Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an inter-ground addition. In other embodiments, the cement precursor material may be Saudi cement precursor, which is a combination of Portland cement precursor and crystalline silica. Crystalline silica is also known as quartz.

In some embodiments of the cement precursor composition, a non-hydraulic-cement precursor is used. A non-hydraulic cement precursor material refers to a mixture of lime, gypsum, plasters and oxychloride. A non-hydraulic cement precursor may take longer to harden or may require drying conditions for proper strengthening, but often is more economically feasible.

In some other embodiments of the cement precursor composition, the cement precursor may include additional materials. The cement precursor material may include, but is not limited to, calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaOAl_2O_3.Fe_2O_3$), gypsum ($CaO_4.2H_2O$), sodium oxide, potassium oxide, limestone, lime (calcium oxide), hexavalent chromium, calcium aluminate, silica sand, silica flour, hematite, manganese tetroxide, and combinations thereof. The cement precursor material may include, but is not limited to, siliceous fly ash, calcareous fly ash, slag cement, silica fume, quartz, any known cement precursor material or combinations of any of these. Silica flour is a finely ground crystalline silica with a molecular formula of $SiO_2$ and with a grain size ranging from about 1 to about 500 microns, such as from 10 to 500 microns, such as from 10 to 100 microns, such as from 10 to 80 microns, such as from 10 to 50 microns, such as from 10 to 20 microns, such as from 20 to 100 microns, such as from 20 to 80 microns, such as from 20 to 50 microns, such as from 50 to 100 microns, such as from 50 to 80 microns, and such as from 80 to 100 microns.

Embodiment slurries may include a previously described oligomer in an amount sufficient to improve mechanical properties of an embodiment cured cement. Inclusion embodiment oligomers may reduce compressive strength to an extent that is beneficial for certain formation conditions. For example, a reduction in compressive strength of up to about 15% as compared to cement having no oligomer may result in improved mechanical properties. However, the compressive strength of cement should remain at least about 45,000 psi (pounds per square inch). As is appreciated by those skilled in the art, the exact compressive strength will depend on a number of factors, including the temperature and pressure of the formation. A slurry having too little oligomer may result in a brittle cured cement. A slurry having too much oligomer may result in a compressive strength that is too low. In some embodiments, the slurry may contain from about 0.5 to about 6.0 wt. % (weight percent) of oligomer by weight of cement precursor (BWOC). Embodiment oligomers may have a lower limit of about 0.5, 1.0, 2.0, 2.5 or 3.0 wt. % BWOC, and an upper limit of 6.0, 5.0, 4.5, 4.0 or 3.5 wt. % BWOC, where any lower limit may be used in combination with any mathematically compatible upper limit.

Embodiment slurries include water. The water may comprise one or more known compositions of water, including distilled; condensed; filtered or unfiltered fresh surface or subterranean waters, such as water sourced from lakes, rivers or aquifers; mineral waters; gray water; run-off, storm or waste water; potable or non-potable waters; brackish waters; synthetic or natural sea waters; synthetic or natural brines; formation waters; production water; and combinations thereof.

Embodiment slurries may include water in an amount sufficient to cure the previously described cement precursor. In some embodiments, the slurry may contain a ratio of cement:water of from about 80:20 to about 40:60. Embodiment slurries may have a ratio of cement:water in the slurry of 80:20, 75:25, 70:30, 65:35, 60:40, 55:45, 50:50, 45:55, or 40:60.

Embodiment slurries may include a suspending agent. Suspending agents are compounds that may increase the viscosity of the slurry and aid in suspending cement particles in water. Embodiment suspending agents may be hydrophilic polymers, such as hydroxyethyl cellulose (HEC), polyhydroxylated polyacrylamide (PHPA), or acrylic and acrylamide-based polymers.

Embodiment slurries may include a suspending agent in an amount sufficient to suspend cement particles in the slurry and achieve a desired viscosity and uniform density. For example, if too much suspending agent is used, the slurry will be too viscous for pumping into a formation. If too little suspending agent is used, cement particles may not be effectively suspended in the slurry, and some cement particles may begin to settle during the curing process, resulting in a non-uniform density in the cement. In some embodiments, the slurry may contain from about 0.1 to about 3.0 wt. % (weight percent) of suspending agent by weight of cement precursor (BWOC). Embodiment suspending agent may have a lower limit of 0.1, 0.25, 0.4, 0.5, 1.0 wt. % BWOC, and an upper limit of 3.0, 2.5, 2.0, or 1.5 wt. % BWOC, where any lower limit may be used in combination with any mathematically compatible upper limit.

Embodiment slurries may have any suitable viscosity for use in cementing formations. Embodiment slurries may have a plastic viscosity in a range of from about 40 to about 100 cP (centipoise) at a temperature in a range of from about 70 to about 180° F. Embodiment slurry viscosities may have a lower limit of 40, 50, 60 or 70 cP, and an upper limit of 100, 90 or 80 cP, where any lower limit may be used in combination with any mathematically compatible upper limit. Embodiment slurries may have a yield point in a range of from about 75 to about 125 $lb_f/100$ $ft^2$ (pounds of force per 100 square feet) at a temperature in a range of from about 70 to about 180° F. Embodiment slurries may have a yield point with a lower limit of 75, 85 or 100 $lb_f/100$ $ft^2$, and an upper limit of 125, 120 or 115 $lb_f/100$ $ft^2$, where any lower limit may be used in combination with any mathematically compatible upper limit. Embodiment slurries may be homogeneous mixtures, meaning the cement, oligomer, and suspending agent and water are evenly distributed throughout the slurry.

Method of Making a Cement Slurry

In one aspect, embodiments disclosed here relate to a method of making the previously described cement slurry. FIG. 1 is a block flow diagram of an embodiment method of making a slurry 100. The method may include blending a previously described phosphazene oligomer and a previously-described cement precursor to form a cement precursor mixture (102). If present, a previously described suspending agent may also be blended with the phosphazene oligomer and the cement precursor to form a cement precursor mixture.

Figure 2:
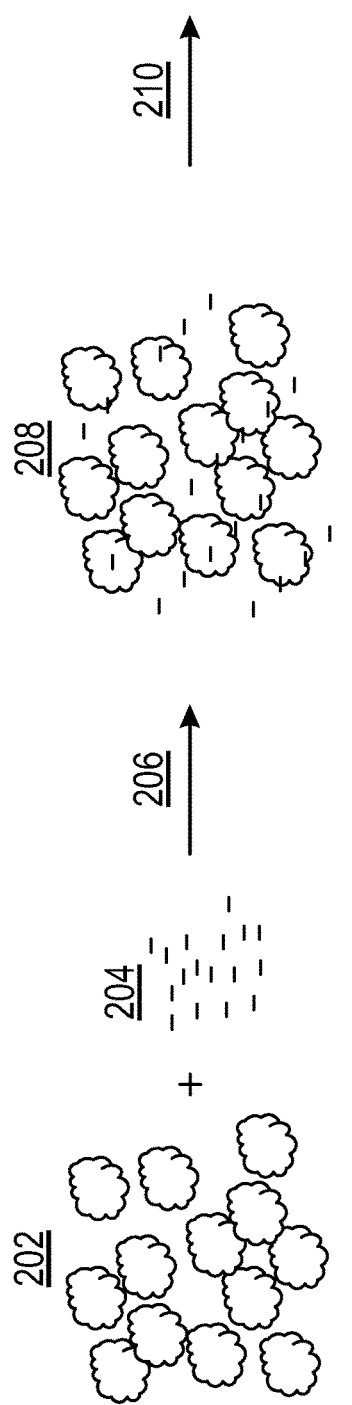
FIG. 2 is a schematic depiction of an embodiment cement slurry and cured cement.

Embodiment methods may further include introducing water into the cement precursor mixture (104). The water may be introduced at a mixing speed of about 8000 RPM (revolutions per minute). After the water has been introduced into the cement precursor mixture, the resultant slurry may be mixed for a time and at a mixing speed suitable for obtaining a homogeneous slurry. Embodiment mixing times may have a lower limit of 10, 20, 30, 35 or 40 seconds, and an upper limit of 60, 55, 50 or 45 seconds, where any lower limit may be used in combination with any mathematically compatible upper limit. Embodiment mixing speeds may have a lower limit of 500, 1,000, 2,000, 5,000 or 8,000 RPM, and an upper limit of 20,000, 18,000, 15,000, or 12,000 RPM, where any lower limit may be used in combination with any mathematically compatible upper limit. In some embodiments, the slurry may be mixed for about 35 seconds at about 12000 RPM. FIG. 2 is a schematic depiction of an embodiment slurry being made via embodiment methods. The cement (202) (depicted in FIG. 2 as cement particles) and the oligomer (204) are blended and water is introduced (indicated by arrow (206)) to form a slurry (208). As depicted in FIG. 2, the oligomer (204) is evenly distributed throughout the cement (202) in the slurry (208).

Method of Use—Cement Slurry

Figure 3:
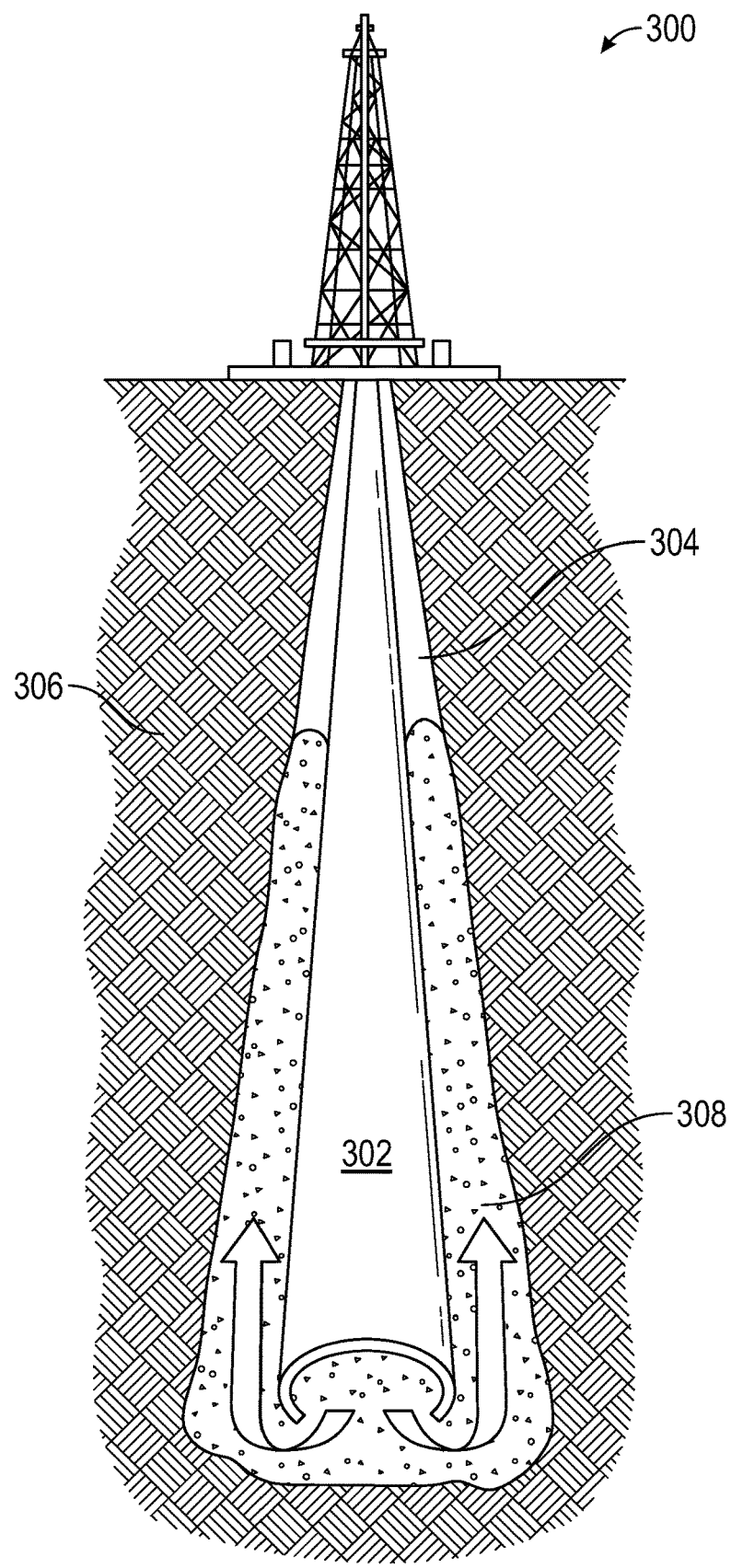
FIG. 3 is a schematic depiction of a formation in accordance with one or more embodiments of the present disclosure.

In one aspect, embodiments disclosed relate to a method of forming a cement sheath in a wellbore. Embodiment methods include introducing the previously described slurry composition into a wellbore (106). The composition may include the previously described oligomer evenly distributed throughout the cement slurry. FIG. 3 is a schematic depiction of cementing a formation (300). The slurry (308) may be pumped downhole through a casing (302). The slurry (308) is then pushed up into an annulus (304) between the formation (306) and the casing (302). The direction of cement flow is indicated by arrows (not labeled). Once the cement has been introduced into the formation, the method may further include maintaining the cement slurry in the wellbore such that a sheath forms (108). The cement sheath may have the previously-described embodiment polyphosphazene polymers evenly distributed throughout the cement matrix.

Cured Cement Composition

In one aspect, embodiment compositions relate to a cured cement matrix having a polyphosphazene polymer distributed throughout the cement matrix. Embodiment cured cements are made by curing the previously-described cement slurries.

Embodiment cement sheaths may include a polyphosphazene polymer in an amount sufficient to improve mechanical properties of the cement. In some embodiments, the cement may contain from about 0.5 to about 6.0 wt. % of polyphosphazene by weight of cement (BWOC). Embodiment polyphosphazene polymers may have a lower limit of 0.5, 1.0, 2.0, 2.5 or 3.0 wt. % BWOC and an upper limit of 6.0, 5.0, 4.5, 4.0 or 3.5 wt. % BWOC, where any lower limit may be used in combination with any mathematically compatible upper limit.

As a result of the even distribution of the previously-described oligomer in the previously-described cement slurry, embodiment cured cements include a polyphosphazene polymer evenly distributed throughout the cured cement matrix. As such, pockets or islands of polymer may not be present in the cement matrix and the cement matrix may have a uniform density. An embodiment cured cement is shown in FIG. 2. The cured cement (212) has polyphosphazene polymer (214) evenly distributed throughout the cement.

Embodiment cements have a density in a range of from about 10 to about 18 ppg (pounds per gallon). Embodiment cements may have a lower limit of 10, 11, 12, 13 or 14 ppg, and an upper limit of 18, 17, 16 or 15 ppg, where any lower limit may be used in combination with any mathematically compatible upper limit.

Embodiment cements may realize improved mechanical properties as compared to cements that do not include a polyphosphazene polymer made by the methods described here. Such improvements may include a decrease in unconfined compressive strength, a decrease in compressive strength, and a decrease in Young's modulus when compared with cements that do not include embodiment polyphosphazene polymers. These improved properties may reduce physical deformation of embodiment cement sheaths when exposed to changes in temperature and pressure, such as those encountered in subterranean formations.

Method of Cementing a Formation

As previously described, embodiment methods may include introducing the previously-described slurry into a wellbore (106) and maintaining the cement slurry in the wellbore such that a cured cement sheath forms (108).

Embodiment methods may include maintaining the cement slurry such that the cement is cured in the wellbore (108). Embodiment slurries may be cured for any suitable time, temperature and pressure in order to cure the cement and polymerize the phosphazene oligomer. Embodiment cements may begin curing upon initial contact with water. Embodiment curing times may be from several hours to several days. Embodiment curing times may have a lower limit of 3, 4, 5, 10, 12 or 24 hours, and an upper limit of 5, 4, 3 or 2 days, where any lower limit may be used in combination with any mathematically compatible upper limit. One of ordinary skill in the art understand that such conditions may vary due to differences in compositions of the embodiment cement slurries and downhole conditions.

Embodiment cement slurries may cure under formation conditions, such as temperatures in a range of from about 25 to about 260° C. and pressures of from ambient pressure to about 45,000 psi. Embodiment formation temperatures may have a lower limit of 25, 50, 65 or 75° C., and an upper limit of 260, 200, 150 or 95° C., where any lower limit may be used in combination with any mathematically compatible upper limit. Embodiment formation pressures may have a lower limit of 15, 100, 1,000, 3,000 or 5,000 psi, and an upper limit of 45,000, 30,000, 20,000, 15,000 or 10,000 psi, where any lower limit may be used in combination with any mathematically compatible upper limit. In some embodiments, the cement curing and polymerization processes occur simultaneously.

Embodiment cements may be used in various subterranean formations for primary and secondary cementing operations.

EXAMPLES

Example 1—Oligomer Synthesis

An oligomer was synthesized by the following method. A first solution was prepared by adding 34.7 g (grams) (0.1 mol) (moles) of hexachlorotriphosphazene to 250 mL (milliliters) of dichloromethane ($CH_2Cl_2$). A second solution was prepared by adding 86.4 g (0.6 mol) of o-phenylenediamine and 84 mL of trimethylamine to 150 mL of $CH_2Cl_2$. The first solution was kept in an ice bath to maintain the temperature between 0 to 8° C. while the second solution was added to the first solution dropwise over 1 to 2 hours with vigorous stirring. The mixture was then stirred at room temperature for 72 hours. The resulting solid product was filtered and washed with hot ethanol three times. The final product is referred to here as Oligomer 1. The reaction pathway is structure (12):

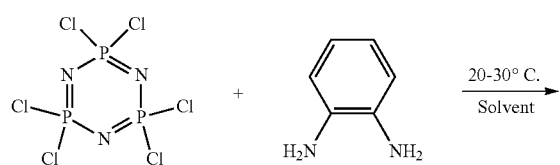

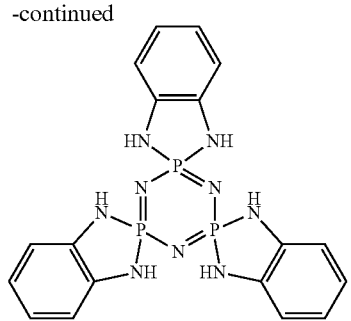

An oligomer was synthesized by the following method. A first solution was prepared by adding 34.7 g (0.1 mol) of hexachlorotriphosphazene to 250 mL of dichloromethane ($CH_2Cl_2$). A second solution was prepared by adding 94.9 g (0.6 mol) of 2,3-diaminonaphthalene and 84 mL of trimethylamine to 200 mL of $CH_2Cl_2$. The first solution was kept in an ice bath to maintain the temperature between 0 to 8° C. while the second solution was added to the first solution dropwise over 1 to 2 hours with vigorous stirring. The mixture was then stirred at room temperature for 72 hours. The resulting solid product was filtered and washed with hot ethanol three times. The final product is referred to here as Oligomer 2. The reaction pathway is structure (13):

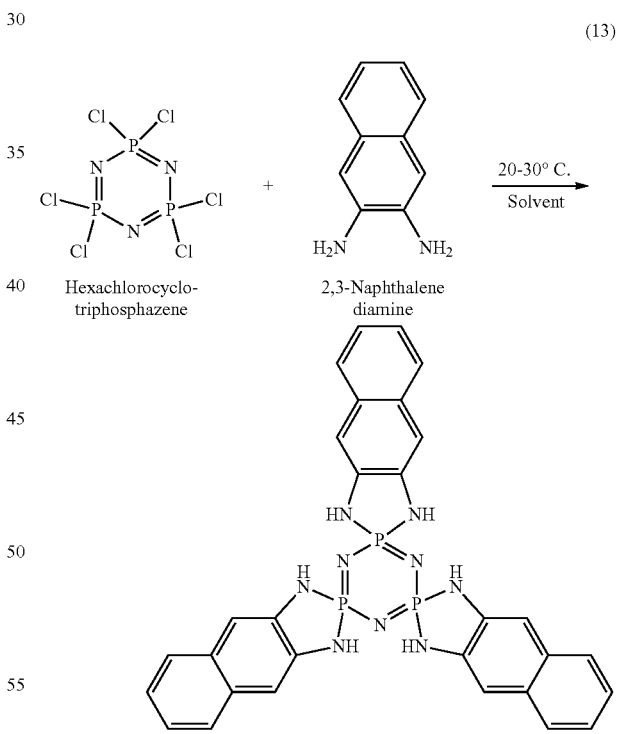

An oligomer was synthesized by the following method. A first solution was prepared by adding 34.7 g (0.1 mol) of hexachlorotriphosphazene to 250 mL of dichloromethane ($CH_2Cl_2$). A second solution was prepared by adding 20 mL (0.6 mol) of ethylenediamine and 84 mL of trimethylamine to 35 mL of $CH_2Cl_2$. The first solution was kept in an ice bath to maintain the temperature between 0 to 8° C. while the second solution was added to the first solution dropwise over 1 to 2 hours with vigorous stirring. The mixture was then stirred at room temperature for 72 hours. The resulting solid product was filtered and washed with hot ethanol three times. The final product is referred to as Oligomer 3. The reaction pathway is structure (14):

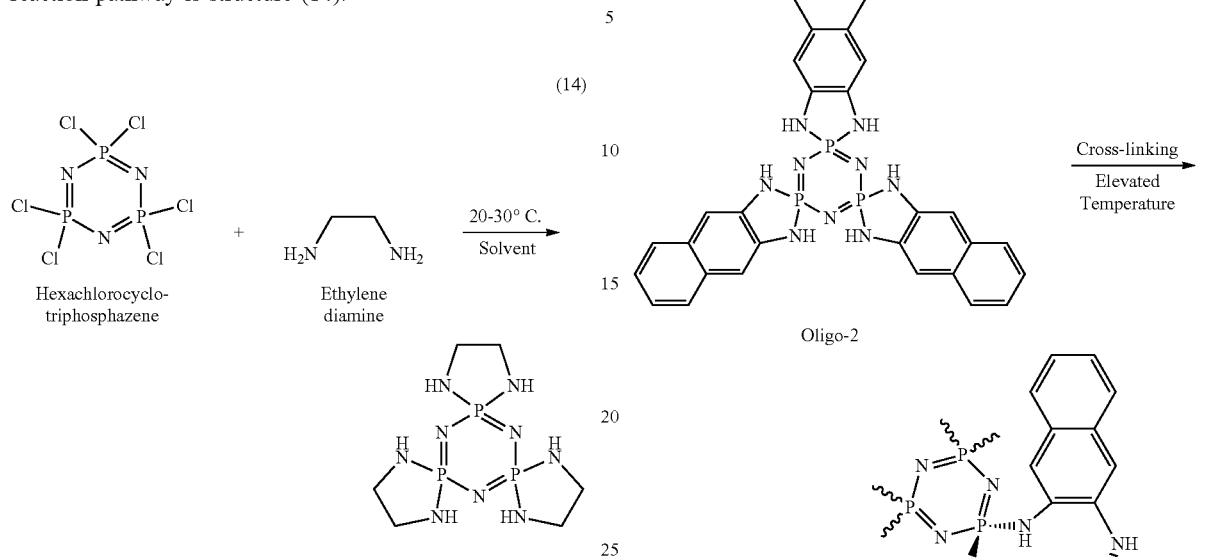

When Oligomers 1-3 are exposed to elevated temperatures in the range of 130 to 180° C., ring opening and ring expansion reactions take place. The structures provided (15), (16), and (17) show the resultant cross-linked polyphosphazenes 1, 2, and 3, formed from Oligomers 1, 2 and 3, respectfully:

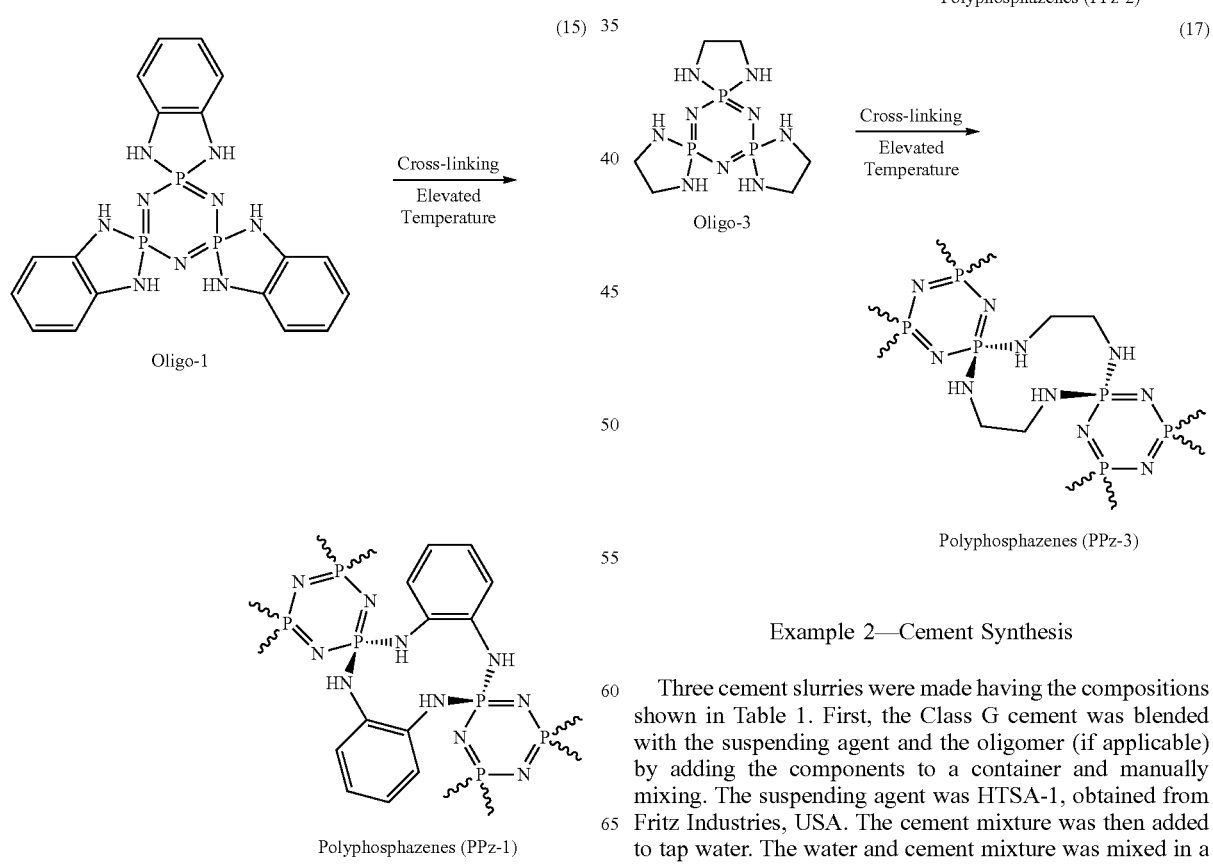

Example 2—Cement Synthesis

Three cement slurries were made having the compositions shown in Table 1. First, the Class G cement was blended with the suspending agent and the oligomer (if applicable) by adding the components to a container and manually mixing. The suspending agent was HTSA-1, obtained from Fritz Industries, USA. The cement mixture was then added to tap water. The water and cement mixture was mixed in a Constant Speed Mixer Model 686CS (Fann Instrument Company, USA) at 8000 RPM, followed by mixing at 12000 RPM for 35 seconds. The resultant slurry was poured into a one inch diameter cylinder and cured in a pressurized curing chamber at a temperature of 150° C. and a pressure of 3000 psi for 48 hours.

TABLE 1

| Sample | Class G Cement (g) | Suspending agent (g) | Oligomer 1 (g) | Oligomer 3 (g) | Water (g) |
|---|---|---|---|---|---|
| Comparative Cement 1 | 617.4 | 2.46 | NA | NA | 408.6 |
| Cement 2 | 617.4 | 2.46 | 18.6 | NA | 408.6 |
| Cement 3 | 617.4 | 2.46 | NA | 18.6 | 408.6 |

Example 3—Mechanical Property Testing

Cylindrical samples measuring one inch in diameter and two inches in length were used for the mechanical properties tests. Unconfined compressive strength was measured using a Forney Model F-250 compressive strength instrument (Fann Instrument Company, USA). Briefly, the samples were placed on the sample stage and force was applied from the top at a ramp rate of 720 pounds of force per second at room temperature until the sample broke. The stress at the break was recorded as unconfined compressive strength.

The compressive strength and Young's modulus were measure using NER Autolab 3000 instrument (New England Research Inc., USA). The cement samples were jacketed and placed between steel end-caps. Static mechanical properties were measured using Linear Variable Differential Transformer sensor (LVDTs) that were mounted on the sample to measure axial deformation and radial deformation. Samples were placed in a triaxial cell and a confining pressure of 3000 psi was applied. The cyclic axial load was applied in the form of triangular waveforms. Each sample was deformed over three cyclic loading series. In each cyclic loading series, a differential stress of 3000 psi was applied during the cyclic loading, and various peak axial stresses were applied during the cyclic loading. Because uniaxial stress was applied on the sample, this module was used to calculate Young's modulus in GigaPascals (GPa) using LVDTs to measure sample strain.

TABLE 2

| | Unconfined compressive strength (psi) | Compressive strength at 25° C. (psi) | Compressive strength at 150° C. (psi) | Young's modulus at 25° C. (GPa) | Young's modulus at 150° C. (GPa) |
|---|---|---|---|---|---|
| Comparative Cement 1 | 5570 | 5862 | 5987 | 15 | 16 |
| Cement 2 | 5224 | 5413 | 5661 | 12.5 | 13 |
| Cement 3 | 5071 | 5124 | 5078 | 10.8 | 11.6 |

As shown by the data in Table 2, the compressive strength of the cement is reduced for the samples with oligomers included in the cement slurry. Reduced compressive strengths are indicative of the better elastic properties in the cement matrix. The increased in compressive strengths of Comparative Cement 1 and Cements 2 and 3 at 150° C. is indicative that the samples were additionally cured at the testing temperature of 150° C. Similarly, the Young's modulus values are lower for Cements 2 and 3. This demonstrates an improvement in the elastic properties for cements with oligomers included in the cement slurry. While not wishing to be bound by a particular mechanism or theory, it is believed that because embodiment phosphazene oligomers are soluble in water, upon addition the embodiment oligomers to embodiment cement slurries, they are uniformly distributed throughout the slurries. Further, due to their uniform distribution in the cement slurry, it is believed that then phosphazene oligomers then are polymerized to form a polyphosphazene polymer that is evenly distributed throughout the resultant embodiment cured cement. This uniform distribution provides for uniform property distribution throughout the cement, and the polyphosphazene polymers provide for improved physical properties for long-term performance success of the resultant cement materials.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims, except for those in which the claim expressly uses the words 'means for' together with an associated function.

What is claimed:

1. A composition of matter comprising:
a cement precursor;
a cyclic phosphazene oligomer; and
water,
wherein the cyclic phosphazene oligomer is configured to undergo polymerization to form a polyphosphazene polymer upon curing of the cement precursor.

2. The composition of matter of claim 1, where the cyclic phosphazene oligomer has the following structure:

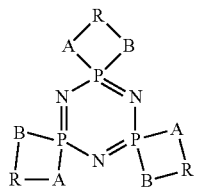

where R is selected from the group consisting of aliphatic, aromatic, alkyl aromatic, and polyaromatic structures; and where A and B are each reduced nucleophilic chemical functionalities of a di-functional compound.

3. The composition of matter of claim 2, where the di-functional compound is selected from the group consisting of aliphatic diamines, aromatic diamines, aliphatic diols, aromatic diols, aliphatic thiols, aromatic thiols, mixed functional groups of aliphatic or aromatic di-functional compounds, and combinations thereof.

4. The composition of matter of claim 2, where the di-functional compound is selected from the group consisting of o-phenylenediamine, trimethylamine, 2,3-diaminonaphthalene, ethylenediamine, ethylene glycol, 1,2-dihydroxy benzene, ethylene dithiol, benzene-1,2-dithiol, 2-mercaptophenol, 1-hydroxy-2-aminobenzene, 2-aminoethen-1-ol, and combinations thereof.

5. The composition of matter of claim 1, where the cyclic phosphazene oligomer has a structure selected from the group consisting of:

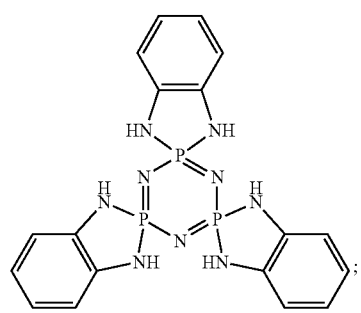

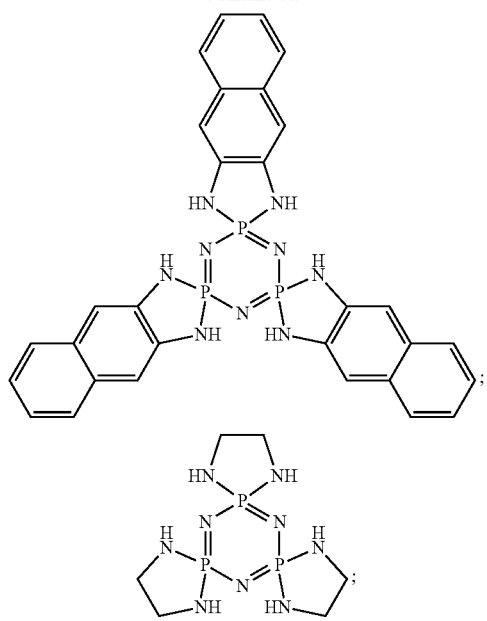

and combinations thereof.

6. The composition of matter of claim 1, where the cement precursor is a Portland cement precursor.

7. The composition of matter of claim 6, where the Portland cement precursor is Class G Portland cement.

8. The composition of matter of claim 1, where the cyclic phosphazene oligomer is in a range of from about 0.5 to about 6.0 wt. % by weight of cement precursor.

9. The composition of matter of claim 1, comprising a ratio of cement:water in a range of from about 80:20 to about 40:60.

10. The composition of matter of claim 1, further comprising a suspending agent.

11. The composition of matter of claim 10, where the suspending agent is in a range of from about 0.1 to about 3.0 wt. % (weight percent) by weight of cement precursor.

12. The composition of matter of claim 1, having a plastic viscosity in a range of from about 40 to 100 cP (centipoise) in a range of from 70 to 180° F.

13. The composition of matter of claim 1, having a yield point in a range of from 75 to 125 lb$_f$/100 ft$^2$ (pounds of force per 100 square feet) at a temperature in a range of from 70 to 180° F.

14. A method of making a cement slurry comprising:
blending a phosphazene oligomer and a cement precursor to form a cement precursor mixture;
introducing water into the cement precursor mixture to form the cement slurry; and
polymerizing the cyclic phosphazene oligomer upon curing of the cement precursor, thereby forming a polyphosphazene polymer in a cement matrix.

15. The method of claim 14, where the blending step comprises blending the phosphazene oligomer and the cement precursor with a suspending agent to form the cement precursor mixture.

16. The method of claim 14, where the phosphazene oligomer has the following structure:

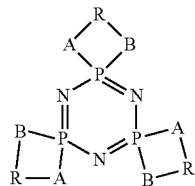

where R is selected from the group consisting of aliphatic, aromatic, alkyl aromatic, and polyaromatic structures; and where A and B are each reduced nucleophilic chemical functionalities of a di-functional compound.

17. The method of claim 16, where the di-functional compound is selected from the group consisting of aliphatic diamines, aromatic diamines, aliphatic diols, aromatic diols, aliphatic thiols, aromatic thiols, mixed functional groups of aliphatic or aromatic di-functional compounds, and combinations thereof.

18. The method of claim 16, where the di-functional compound is selected from the group consisting of o-phenylenediamine, trimethylamine, 2,3-diaminonaphthalene, ethylenediamine, ethylene glycol, 1,2-dihydroxy benzene, ethylene dithiol, benzene-1,2-dithiol, 2-mercaptophenol, 1-hydroxy-2-aminobenzene, 2-aminoethen-1-ol, and combinations thereof.

19. The method of claim 14, where the cyclic phosphazene oligomer has a structure selected from the group consisting of:

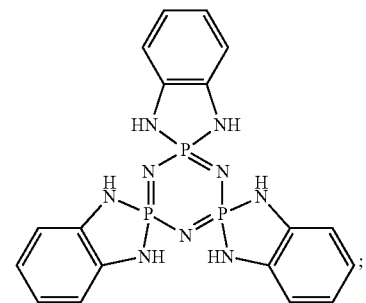

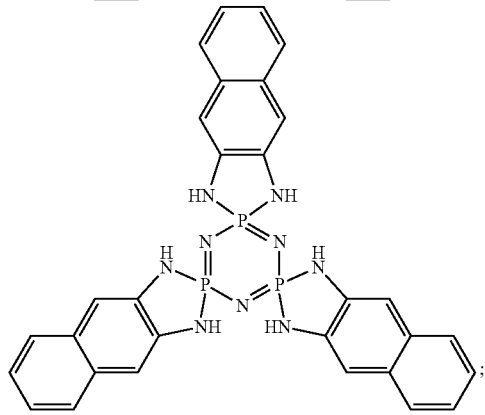

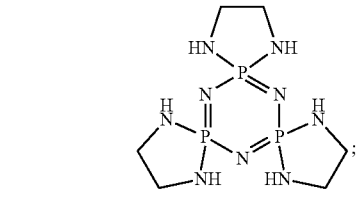

and combinations thereof.